United States Patent [19]

Gancy et al.

[11] 4,022,867

[45] May 10, 1977

[54] SOLUBLE SILICATE REDUCTION IN SODIUM CARBONATE CRYSTALLIZER MOTHER LIQUORS

[75] Inventors: Alan B. Gancy; Rustom P. Poncha, both of Syracuse, N.Y.

[73] Assignee: Allied Chemical Corporation, Morris Township, N.J.

[22] Filed: June 17, 1975

[21] Appl. No.: 587,575

[52] U.S. Cl. .............................. 423/184; 23/302 T; 423/206 T; 423/421
[51] Int. Cl.² ...................................... C01D 7/00
[58] Field of Search ............... 423/184, 206 T, 421; 23/302 T

[56] References Cited

UNITED STATES PATENTS

| | | | |
|---|---|---|---|
| 3,869,538 | 3/1975 | Sprouz et al. | 423/206 T |
| 3,870,780 | 3/1975 | Guptill | 423/206 T |

*Primary Examiner*—O. R. Vertiz
*Assistant Examiner*—Wayne A. Langel

*Attorney, Agent, or Firm*—Gerhard H. Fuchs; Gerard P. Rooney

[57] ABSTRACT

In the process for making sodium carbonate from trona, the soluble silicate content of crystallizer mother liquor from which sodium carbonate precursor crystals are obtained by evaporative crystallization is reduced by the method which comprises:

1. digesting said mother liquor at elevated temperature for time sufficient to reduce soluble silicates, in the presence as treating agent of insolubles which have been obtained by (a) calcination of crushed trona, (b) segregation of a fine particle size fraction from the calcined trona, (c) dissolution of said fine particle size fraction in an aqueous medium to obtain a solution comprising sodium carbonate and insolubles, followed by (d) separating insolubles, and
2. separating the insolubles from the digested mother liquor, and recycling the mother liquor to the process.

18 Claims, No Drawings

SOLUBLE SILICATE REDUCTION IN SODIUM CARBONATE CRYSTALLIZER MOTHER LIQUORS

BACKGROUND OF THE INVENTION

Trona deposits in Sweetwater and adjacent counties in Wyoming are found at depths of about 1500 feet underground and consist of a main trona bed varying from 8 to 10 feet in thickness. The trona consists mainly of sodium sesquicarbonate ($Na_2CO_3 \cdot NaHCO_3 \cdot 2H_2O$) containing about 3 to 15% or, more generally, 5 to 10% of insoluble impurities, mainly shale.

A typical natural trona composition is given below:

| | |
|---|---|
| $Na_2CO_3$ | 41.8% |
| $NaHCO_3$ | 33.1% |
| $H_2O$ | 14.1% |
| | 89.0% |
| Insolubles: | |
| Dolomite $CaCO_3 \cdot MgCO_3$ | 5.5% |
| Quartz $SiO_2$ | 1.1% |
| Feldspar (K,Na) | |
| $20 \cdot xAl_2O_3 \cdot ySiO_2 \cdot zH_2O$ | 3.3% |
| Clay $2K_2O \cdot 3MgO \cdot 8Fe_2O_3 \cdot 24SiO_2 \cdot 12H_2O$ | 0.6% |
| Shortite $Na_2CO_3 \cdot 2CaCO_3$ | 0.1% |
| Organic Matter as Elemental Carbon | 0.2% |
| Other (by Difference) | 0.2% |

Additionally, the trona usually also contains small amounts of soluble chlorides and sulfates. Two methods for obtaining soda ash from trona are in commercial use. The first involves calcination of crude trona at elevated temperature to yield crude sodium carbonate:

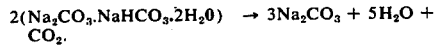

$$2(Na_2CO_3 \cdot NaHCO_3 \cdot 2H_2O) \rightarrow 3Na_2CO_3 + 5H_2O + CO_2.$$

The crude sodium carbonate thus obtained is not of sufficient purity for commercial use. Hence, it is usual practice to purify it by crystallization. The second method for obtaining commercial grade soda ash from trona involves dissolving the trona directly, to separate purified sesquicarbonate crystals from the solution, and to calcine these crystals to transform them into commercial grade soda ash.

Calcination of trona effects moisture removal, reduction of elimination of organic matter as well as transformation of the sodium sesquicarbonate into sodium carbonate. Effectiveness of reduction of organic matter increases with increasing calcination temperature. Unfortunately, however, calcination at elevated temperature also causes sodium carbonate to react with silica contained in the trona to form soluble silicates, and formation of such soluble silicates also increase with increasing calcination temperature.

Soluble silicates are a major impurity in mother liquors from which sodium carbonate precursor crystals are obtained by evaporative crystallization. Unless steps are taken to reduce soluble silicate content of such mother liquors, soluble silicates become a significant impurity in the soda ash product. In the past, levels of soluble silicates in such mother liquors as well as levels of other contaminants, such as $NaCl$ and $Na_2SO_4$, have been controlled or maintained by purging part of the mother liquor. This, of course, entailed loss of valuable soda values.

It has already been proposed to reduce contamination by soluble silicates of aqueous sodium carbonate solutions obtained by dissolving calcined trona in aqueous media by digesting the solutions at elevated temperature above about 160° F. for time sufficient to substantially reduce the soluble silicates contained therein. Apparently, there is some interaction between the insoluble impurities and the soluble silicates in such solutions, rendering insoluble or absorbing the soluble silicates to reduce their concentration in the solution on digestion. In our copending U.S. application Ser. No. 587,585 filed of even date herewith, there is described an improvement in the process of making sodium carbonate from trona by the method involving crushing the trona, calcining it and dissolving it in an aqueous medium for purification by crystallization, which improvement results in reduction of silicate contamination of the crystallization liquor and which improvement involves (a) segregating the calcined trona into a coarse and a fine particle size fraction; (b) separately dissolving the coarse and the fine particle size fractions to obtain aqueous solution of sodium carbonate, sodium silicates and insoluble impurities; followed by (c) digesting the solution of the fine particle size fraction at elevated temperature to insolubilize soluble silicates, and separating the digested solution from insoluble impurities.

SUMMARY OF THE INVENTION

In accordance with the present invention, there is provided a method for treating soluble silicate-containing aqueous carbonate process crystallizer mother liquor from the process for making sodium carbonate precursor crystals by evaporative crystallization, which comprises:

1. digesting said mother liquor at elevated temperature, for time sufficient to reduce soluble silicates, in the presence as treating agent of insolubles which have been obtained by calcination of crushed trona, segregation of a fine particle size fraction from the calcined trona, dissolving of said fine particle size fraction in an aqueous medium to obtain a solution comprising sodium carbonate and insolubles, followed by separating insolubles, and 2. separating the insolubles from the digested mother liquor.

Sodium carbonate precursor crystals for purposes of the present invention are those selected from the group consisting of sodium bicarbonate, sodium sesquicarbonate, anhydrous sodium carbonate, sodium carbonate monohydrate, sodium carbonate heptahydrate and sodium carbonate decahydrate.

DETAILED DESCRIPTION OF THE INVENTION AND OF THE PREFERRED EMBODIMENTS

The sodium sesquicarbonate content of naturally occurring trona can be simply transformed into sodium carbonate by calcining the trona. However, sodium carbonate obtained by calcining trona is not of sufficient purity to serve as raw material in the various applications in which soda ash is used, e.g., making glass. Hence, various methods for obtaining pure sodium carbonate from trona have been described. Generally, these can be classified into the sodium sesquicarbonate crystallization processes and the sodium carbonate crystallization processes. In the former, the trona is dissolved in water or process liquors to form a solution of sodium sesquicarbonate and insolubles. Insolubles are separated by clarification or filtration and sodium sesquicarbonate crystals are obtained from the clarified solution, usually by evaporative crystallization. The sodium sesquicarbonate crystals are then calcined to obtain soda ash.

In the sodium carbonate method, the trona is first calcined, the calcined trona is dissolved in water or process liquors to obtain solution of sodium carbonate and insolubles. Insolubles are separated by clarification or filtration, and from the clarified solution the sodium carbonate may be obtained in the form of anhydrous, monohydrate, heptahydrate or decahydrate crystals by crystallization. The hydrated crystals are usually calcined to remove water of crystallization to obtain dense anhydrous soda ash.

It is also known to obtain sodium bicarbonate crystals from sodium carbonate or sodium sesquicarbonate solutions by introducing carbon dioxide into saturated or nearly saturated sodium sesquicarbonate or sodium carbonate solutions to precipitate the less soluble sodium bicarbonate. The sodium bicarbonate can also be transformed into sodium carbonate by calcination.

For purposes of the present invention, aqueous sodium carbonate process crystallizer mother liquors from the process of making sodium carbonate precursor crystals are substantially saturated aqueous solutions from which the sodium carbonate precursor crystals, i.e., sodium bicarbonate, sodium sesquicarbonate, anhydrous sodium carbonate, sodium carbonate monohydrate, sodium carbonate heptahydrate and sodium carbonate decahydrate may be crystallized as stable crystal phase and recovered from mother liquor. The present invention provides a method for reducing soluble silicate content of such carbonate process crystallizer mother liquor. In accordance with the present invention, the method for treating aqueous carbonate process crystallizer mother liquor from the process of making sodium carbonate precursor crystals by evaporative crystallization for the purpose of reducing the content of soluble silicate thereof comprises (1) digesting said mother liquor at elevated temperature above about 160° F, desirably at temperature in the range of from 160° to 300° F, (under superatmospheric pressure if at temperatures above about 215° to 220° F.) preferably at temperature in the range of from 185° to 210° F, for time sufficient to insolubilize soluble silicates in the presence, as treating agent, of insolubles which have been obtained by (a) calcination of crushed trona, (b) segregation of a fine particle size fraction from the calcined trona, (c) dissolution of said fine particle size fraction in an aqueous medium to obtain a solution comprising sodium carbonate and insolubles, followed by (d) separating insolubles, and (2) separating the insolubles from the digested mother liquor.

Treatment for reduction of soluble silicates in accordance with the method of the present invention reduces the amount of carbonate process crystallizer mother liquor which otherwise would have to be purged from the crystallization process in order to maintain silicate content thereof at levels sufficiently low to meet silicate specifications of the sodium carbonate product. Reduction of amount of mother liquor purge minimizes loss of soda values and pollution of the environment. Reduction of silicate content of carbonate process crystallizer mother liquor also contributes to prevention of scale formation in the process equipment since high concentrations of silicate contribute to formation of analcite scale ($NaAlSi_2O_6 \cdot H_2O$).

The insolubles which are used as treating agent for reducing soluble silicate content of aqueous carbonate process crystallizer mother liquor in accordance with the present invention are obtained as follows: Crude trona is crushed to particle size predominately smaller than 3 inch, preferably about one-half inch average diameter. It is then calcined at temperatures ranging from about 250° to about 1,000° F. During or following the calcining operation the trona is segregated into a fine particle size fraction, having particle size of less than about 60 mesh, preferably less than about 100 mesh (Tyler), and a coarse particle size fraction, having particle size larger than about 60 mesh, preferably larger than about 100 mesh. A preferred fine particle size fraction is that portion of the trona which in the calcination operation is entrained in the gases vented from the calciner and is collected in suitable dust separators in order to prevent escape into the atmosphere (calciner dust). Calciner dust usually has particle size of less than about 80 mesh (Tyler). The fine particle size fraction calcined trona is dissolved in water or in an aqueous medium, usually an aqueous sodium carbonate solution, usually at elevated temperature, to obtain a sodium carbonate solution containing insolubles. If desired, the fine particle size fraction calcined trona may be dissolved under agitation, preferably at elevated temperature above about 160° F., preferably from 185° to 210° F., and the solution is maintained at that temperature for time sufficient to lower soluble silicate content thereof, preferably for time from between about 30 minutes to 8 hours. The insolubles are then separated from the solution by any suitable method, such as sedimentation or filtration, or any combination thereof, and the separated insolubles thus obtained serve as treating agent for the aqueous sodium carbonate process crystallizer mother liquor in accordance with the method of the present invention.

In a typical trona processing operation a carbonate process solution which has been clarified and filtered is passed in series through crystallization units, typically multiple effect evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The effects are numbered in the direction of flow. As the carbonate process solution passes through the crystallizers, a slurry of sodium carbonate precursor crystals is formed and passed to each succeeding crystallizer. The slurry is passed from one effect to the other in the chosen direction by a series of pumps. From the last effect the slurry, containing about 15 to 60 percent, preferably about 30 to 50 percent, solids is allowed to settle. The sodium carbonate precursor crystals are separated and the mother liquor separated from the sodium carbonate precursor crystals is combined with the freshly filtered carbonate process solution which is to be fed to the crystallizer to effect crystallization of a second crop of precursor crystals.

Exemplary prior art crystallization procedures for the processing of trona solutions may be found in the disclosures of U.S. Pat. Nos. 2,704,239 (crystallization of sodium bicarbonate), 2,770,524 (crystallization of anhydrous sodium carbonate); 2,639,217 and 3,028,215 (crystallization of sodium sesquicarbonate); and 2,343,080, 2,343,081, 2,962,348, 3,131,996 and 3,260,567 (crystallization of sodium carbonate monohydrate). In each of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallizer unit becomes too thick or viscous, a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted so soda ash. The mother liquor is then recycled to the system passing through the first effect evaporator crystallizer together with clarified and filtered trona process solution not previously treated in the crystallizer. In some processes a portion of the mother liquor is used to dissolve additional trona. In each case, a part of the mother liquor is discarded as purge in order to maintain impurities within the recycled mother liquor at levels sufficiently low to meet soda ash product specification with respect to impurities, e.g., silicate. In usual operation, between about 2% and about 10%, more generally between about 3% and 5% by weight of the recycled mother liquor must be purged in order to maintain product quality. Treatment of carbonate process crystallizer mother liquor in accordance with the method of our invention reduces the amount of said liquor which must be purged. Treatment of mother liquor in accordance with our invention simply involves adding the insolubles obtained as described above to the crystallizer mother liquor, preferably with agitation, and digesting the mother liquor at elevated temperature above about 160° F., desirably at temperature within the range of from 160° to 300° F., preferably within the range of from 185° to 210° F. for time sufficient to lower soluble silicate content thereof, preferably for time from between about 30 minutes and 8 hours. For the digestion step, insolubles are added to the mother liquor in amount of from 5% to 20%, preferably from 7% to 15% by weight, based on the combined weight of mother liquor and insolubles.

While it is possible to subject all the mother liquor as it is being recycled to treatment in accordance with our invention, we have found that only a small portion thereof need be treated in order to maintain silicates at desirably low levels, say at levels of less than about 2000 ppm. (basis $Na_2CO_3$) or, more preferably less than about 1500 ppm. within the mother liquor. This can readily be accomplished by treating a portion of the recycled stream or, more preferably about 3 to 5% by volume the recycled stream. It should be noted that soluble silicate reduction in accordance with our invention method does not avoid need for purging part of the mother liquor in order to reduce other impurities, such as sodium chloride and sodium sulfate which otherwise would build up to undersirable levels. Nevertheless, treatment in accordance with our invention process substantially reduces amount of liquor that must be purged.

Digestion in accordance with our invention may be carried out in any suitable vessel, open to the atmosphere or closed. In the event the mother liquor is a sodium bicarbonate or sodium sesquicarbonate solution, it may be desirable to carry out the digestion under an atmosphere of carbon dioxide in order to prevent decomposition of the bicarbonate or sesquicarbonate under formation of carbon dioxide. Following digestion, insolubles are separated from the mother liquor by usual methods, as by settlement, centrifugation, elutriation, filtration or the like, and the mother liquor is recycled to the crystallization step.

The following examples wherein parts are by weight illustrate the method of the present invention.

EXAMPLE I a. Separation of Insolubles.

Crude trona was crushed to particle size of less than about one-half inch and was calcined in a direct fired rotary furnace at temperature of about 350° F. The dust discharged with the gaseous effluent from the furnace was collected. It had particle size of about 96% passing through 80 mesh (Tyler) screen. Five hundred seventy parts of the dust were added to 1200 parts of water, and the resulting solution was digested under stirring at temperature of 194° F. for about 45 minutes. Thereafter, insolubles were allowed to settle and the supernatant liquid was decanted.

b. Digestion of Sodium Carbonate Mother Liquor

A vessel equipped with stirrer and cover immersed in an oil bath maintained at 90° C. with thermostatic control was charged with 300 parts sodium carbonate crystallizer purge liquid containing about 30% $Na_2CO_3$ and 12,600 ppm., basis $Na_2CO_3$, of silicate, expressed as $SiO_2$. Insolubles obtained as described above were added in amount sufficient to give a 7.5% by weight slurry of insolubles. Soluble $SiO_2$ content of the slurry was calculated at 6700 ppm. on account of dilution with insolubles slurry. Fifty ml. samples of the slurry were withdrawn at timed intervals for determination of silicate levels. The samples so withdrawn were filtered through a 0.22 micron millipore filter into 50 ml. portions of water. Silicate levels in the water were determined by acidifying the samples to pH 1.4, adding ammonium molybdate to form the yellow complex, followed by determination of absorbance at 410 m$\mu$ in an electrophotometer. Corresponding silicate concentrations were read from appropriate standard curves. Table I below shows the results obtained:

TABLE I

| Digestion Time | $SiO_2$, ppm. (basis $Na_2CO_3$) |
| --- | --- |
| 0 minutes | 6,700 ppm. |
| 15 minutes | 3,710 ppm. |
| 30 minutes | 3,640 ppm. |
| 1 hour | 3,320 ppm. |
| 2 hours | 2,490 ppm. |

EXAMPLE II

Insolubles were obtained as described above in Example I, except that the insolubles were separated by filtration, rather than by sedimentation followed by decantation. The insolubles were added to mother liquor purge containing about 12,200 ppm. $SiO_2$ in amount sufficient to obtain a 12% solids slurry. Soluble $SiO_2$ content of the slurry was calculated at 9580 ppm. on account of dilution with the insolubles filter cake. The slurry was subjected to digestion and samples were taken and analyzed for $SiO_2$ content as described above in Example I. Results are summarized in Table II below:

TABLE II

| Digestion Time | SiO₂ ppm. (basis Na₂CO₃) |
| --- | --- |
| 0 minutes | 9,580 ppm. |
| 30 minutes | 2,330 ppm. |
| 1¼ hours | 1,920 ppm. |
| 3 hours | 1,280 ppm. |

Example II illustrates increase in reduction of silicate contamination with increasing amount of insolubles employed.

While the above Examples illustrate reduction of silicate contamination in sodium carbonate crystallizer mother liquor, similar results are obtained when sodium bicarbonate or sodium sesquicarbonate crystallizer mother liquors are treated by this method, that is to say, soluble silicate levels are substantially reduced by digesting mother liquors containing sodium bicarbonate or sodium sesquicarbonate at elevated temperature for time sufficient to reduce soluble silicates in the presence, as treating agent, of insolubles which have been obtained by calcination of crushed trona, segregation of a fine particle size fraction from calcined trona, dissolution of said fine particle size fraction in an aqueous medium to obtain a solution comprising sodium carbonate and insolubles, followed by separating insolubles and use thereof for digesting the sodium bicarbonate or sesquicarbonate mother liquors.

As previously stated, soluble silicate reduction in accordance with our invention method reduces, but does not avoid need for purging part of the mother liquor in order to reduce other impurities, such as chlorides and sulfates, which otherwise would build up to undersirable levels. However, our invention also provides means for recovering a substantial part of the sodium carbonate values from the liquor which must be committed to purge in order to maintain chloride and sulfate levels within tolerable limits. In accordance with our invention, the liquor which is to be committed to purge (purge liquor) is first digested at elevated temperature for time sufficient to reduce soluble silicates, in the presence as treating agent of insolubles which have been obtained by calcination of crushed trona, segregation of a fine particle size fraction from the calcined trona (preferably calciner dust) dissolution of said fine particle size fraction in an aqueous medium to obtain a solution comprising sodium carbonate and insolubles, followed by separating insolubles. Following digestion of the purge liquor in the presence of such insolubles, the insolubles are separated from the digested purge liquor. This treatment, as above explained, results in reduction of soluble silicates. It does not, however, reduce chlorides and sulfates. The liquor so treated is then subjected to conditions under which sodium carbonate monohydrate is crystallized therefrom. We have found that the sodium carbonate monohydrate crystals substantially reject sulfates and chlorides, so that the sodium carbonate monohydrate crystals thus obtained from the treated purge liquor are substantially free of silicates, as well as of chlorides and sulfates. The crystals thus recovered can be combined with the sodium carbonate precursor crystals obtained in the process, or they may be separately calcined to obtain dense soda ash. The mother liquor of the sodium carbonate monohydrate crystallization from the treated purge liquor is discarded. Optionally, the digested purge liquor freed from insolubles is further treated with activated carbon to reduce carbonaceous impurities therefrom, in known manner, prior to crystallizing sodium carbonate monohydrate crystals therefrom. This scheme permits substantial recovery of relatively high purity sodium carbonate from the purge liquor.

We claim:

1. The method for treating soluble silicate-containing aqueous carbonate process crystallizer mother liquor from the process for making sodium carbonate precursor crystals by evaporative crystallization which comprises:

a. digesting said mother liquor at elevated temperature, for time sufficient to reduce soluble silicates, in the presence as treating agent of insolubles which have been obtained by calcination of crushed trona, segregation of a fine particle size fraction from the calcined trona, dissolution of said fine particle size fraction in an aqueous medium to obtain a solution comprising sodium carbonate and insolubles, followed by separating insolubles, and b. separating the insolubles from the digested mother liquor.

2. The method of claim 1 wherein said mother liquor is digested in the presence of said insolubles at temperatures within the range of 160° to 240° F.

3. The method of claim 2 wherein said insolubles had been obtained by calcination of crushed trona at temperature between about 250° and 400° F., segregation of a fine particle size fraction substantially passing through 60 mesh screen (Tyler), dissolution of said fine particle size fraction in an aqueous medium to obtain a solution comprising sodium carbonate and insolubles, followed by separating insolubles.

4. The method of claim 3 wherein the mother liquor being treated is the recycle stream of a continuous multi-effect evaporative crystallizer operation for making sodium carbonate monohydrate crystals.

5. The method of claim 1 wherein the soluble silicate-containing aqueous carbonate process crystallizer mother liquor is an aqueous sodium carbonate solution and the sodium carbonate precursor crystals are sodium carbonate monohydrate crystals.

6. The method of claim 5 wherein said fine particle size fraction calcined trona comprises calciner dust.

7. The method of claim 1 wherein the insolubles have been obtained by calcination of crushed trona at temperature between about 250° and 400° F., segregation of a fine particle size fraction substantially passing through 60 mesh screen (Tyler), dissolution of said fine particle size fraction in an aqueous medium to obtain a solution comprising sodium carbonate and insolubles, followed by separating insolubles.

8. The method of claim 7 wherein said fine particle size fraction calcined trona comprises calciner dust.

9. The method of claim 1 wherein the soluble silicate-containing aqueous carbonate process crystallizer mother liquor is an aqueous sodium carbonate solution.

10. The method of claim 1 wherein the soluble silicate-containing aqueous carbonate process crystallizer mother liquor is an aqueous sodium carbonate solution and the sodium carbonate precursor crystals are sodium carbonate monohydrate crystals, and wherein said mother liquor is digested in the presence of said insolubles at temperature within the range of 160° to 215° F.

11. The method for treating aqueous sodium carbonate mother liquor from the process for making sodium carbonate monohydrate crystals by evaporative crystallization which comprises:

a. digesting said mother liquor at temperature between about 160° and 215° F. for time sufficient to reduce soluble silicates in the presence as treating agent of insolubles which have been obtained by calcination of crushed trona at temperature between about 250° and 400° F., segregation from the calcined trona of a fine particle size fraction substantially passing through 60 mesh (Tyler) dissolution of said fine particle size fraction in an aqueous medium to obtain a solution comprising sodium carbonate and insolubles, followed by separating insolubles, wherein such insolubles are added to said mother liquor in amount of from 5% to 20% by weight, based on the combined weight of mother liquor and insolubles, and b. separating the insolubles from the digested mother liquor.

12. The method of claim 11 wherein the mother liquor being treated represents from about 2 to 10% by volume of said recycle stream.

13. The method of claim 11 wherein the fine particle size fraction calcined trona comprises calciner dust and wherein the mother liquor being treated represents from about 2 to 10% by volume of said recycle stream.

14. The method for recovering soda values from purge liquor from the process for making sodium carbonate crystals which comprises:

a. digesting said purge liquor at elevated temperature, for time sufficient to reduce soluble silicates, in the presence as treating agent of insolubles which have been obtained by calcination of crushed trona, segregation of a fine particle size fraction from the calcined trona, dissolution of said fine particle size fraction in an aqueous medium to obtain a solution comprising sodium carbonate and insolubles, followed by separating insolubles;

b. separating the insoluble from the digested purge liquor;

c. crystallizing sodium carbonate monohydrate crystals from the digested purge liquor freed from insolubles; and d. recovering the sodium carbonate monohydrate crystals.

15. The method of claim 14 wherein the insolubles have been obtained by calcination of crushed trona at temperature between about 250° and 400° F., segregation of a fine particle size fraction substantially passing through 60 mesh screen (Tyler), dissolution of said fine particle size fraction in an aqueous medium to obtain a solution comprising sodium carbonate and insolubles, followed by separating insolubles.

16. The method of claim 15 wherein said fine particle size fraction calcined trona comprises calciner dust.

17. The method of claim 16, wherein the digested purge liquor, from which insolubles have been separated, is treated with activated carbon to remove carbonaceous impurities therefrom, prior to crystallizing sodium carbonate monohydrate crystals therefrom.

18. The method of claim 14, wherein the digested purge liquor, from which insolubles have been separated, is treated with activated carbon to remove carbonaceous impurities therefrom, prior to crystallizing sodium carbonate monohydrate crystals therefrom.

* * * * *